United States Patent [19]

Kocher

[11] Patent Number: 5,016,955
[45] Date of Patent: May 21, 1991

[54] HOLOGRAPHIC LASER SCANNER MOTOR

[75] Inventor: Haribhajan S. Kocher, Penfield, N.Y.

[73] Assignee: Eastman Kodak Company, Rochester, N.Y.

[21] Appl. No.: 511,132

[22] Filed: Apr. 19, 1990

[51] Int. Cl.⁵ .................. G02B 26/10; G02B 5/32
[52] U.S. Cl. .................. 350/3.71; 350/6.2; 350/6.3
[58] Field of Search .................. 350/3.71, 6.2, 6.3, 350/6.6, 6.7, 6.8; 310/52, 104, 90, 192

[56] References Cited

U.S. PATENT DOCUMENTS

| | | |
|---|---|---|
| 3,721,487 | 3/1973 | Pieuchard et al. .................. 350/3.71 |
| 4,540,247 | 9/1985 | Nishi et al. .................. 350/3.71 |
| 4,556,278 | 12/1985 | Schell . |
| 4,610,500 | 9/1986 | Kramer . |
| 4,655,541 | 4/1987 | Yamazaki et al. .................. 350/6.2 |
| 4,717,223 | 1/1988 | Ishida et al. . |
| 4,726,640 | 2/1988 | Iwama et al. . |
| 4,848,862 | 7/1989 | Yamazaki et al. .................. 350/6.8 |
| 4,852,956 | 8/1989 | Kramer .................. 350/3.71 |

FOREIGN PATENT DOCUMENTS 59-101068 6/1984 Japan .

Primary Examiner—Scott J. Sugarman
Assistant Examiner—Martin Lerner
Attorney, Agent, or Firm—Parkhurst, Wendel & Rossi

[57] ABSTRACT

A holographic scanning motor is disclosed that includes a ring shaped rotor, a hologon scanning disc located within the ring shaped rotor, an air bearing assembly on which the rotor rides, and a stator assembly coupled to the air bearing assembly by a sleeve structure, wherein the sleeve structure includes at least one vent hole. The rotor is Y-shaped which permits a very compact planar motor design. Further reductions in size are accomplished by locating the permanent rotor magnets within the stem of the rotor. Additional cooling capacity is provided by mounting at least one fan blade adjacent to the hologon scanner disc on at least one side of the rotor. A mounting pad for the hologon scanning disc is also provided that has a higher thermal resistance than the rotor.

22 Claims, 5 Drawing Sheets

HOLOGRAPHIC LASER SCANNER MOTOR

FIELD OF THE INVENTION

The invention is related to a holographic laser scanner motor of a type which incorporates a hologon scanning disc mounted within a hollow rotor. In particular, the invention is related to a holographic laser scanner motor having an improved structure that aids in maintaining the temperature stability of the hologon scanning disc to prevent optical distortions due to nonuniform heating.

BACKGROUND OF THE INVENTION

Lasers scanners employing hologon discs have been developed for a variety of applications including bar code scanning in electronic point of sale systems and various types of imaging systems. U.S. Pat. No. 4,610,500 issued to Kramer on Sept. 9, 1986, for example, discloses a hologon laser scanner apparatus that includes a hologon scanner disc and a motor for rotating the hologon scanner disc. The hologon scanner disc is coupled to the motor with a shaft that is inserted into a hub provided in the center of the hologon disc. The end of the shaft defines a shoulder that bears against the lower surface of the hub. A screw is used to clamp the hub against the shoulder. The hologon scanner disc includes one or more deflection gratings which are used to deflect the path of a laser beam focused on the disc as the disc is rotated by the motor. A lens is provided to focus the deflected laser beam on a image surface.

Problems have been experienced with laser scanners of the type disclosed in U.S. Pat. No. 4,610,500, namely those having a disc coupled to a driving motor by a shaft. As described in Japanese Kokai No. 59-101068, the hologon scanner disc is susceptible to the formation of tiny cracks due to vibrations at high speeds where the disc is mounted to the motor drive shaft. Japanese Kokai No. 59-101068 proposes to eliminate the problems associated with the mounting of hologon scanner discs on drive shafts by making the scanner disc part of the rotor of the motor. Specifically, the scanner disc is mounted in the inner circumference of a ring that has a number of magnets located on its outer circumference. The ring is mounted in a frame structure made of a magnetic material. A field-generating magnet is mounted within the frame structure. The overall structure constitutes a linear motor with the frame structure acting as the primary core and the magnets located on the ring as the secondary conductor. Application of an electrical signal to the field-generating magnets causes the ring, with the scanner disc included, to rotate.

The use of the hologon scanner disc as part of the motor rotor provides advantages over mounting the disc to a drive shaft in addition to the elimination of the cracks described above, for example, the overall size of the scanning apparatus is greatly reduced. At the same time, however, additional problems are created which are particularly detrimental to printing systems employing the scanning apparatus. The hologon scanner disc has a tendency to heat up in a nonuniform manner due to the heat generated in the stator and rotor windings. The nonuniform heating causes mechanical strain and/or shifting of the grating provided on the disc, which in turn causes the laser beam to be improperly deflected. Thus, the optical distortions of the disc due to nonuniform heating directly result in degradation of image quality.

In view of the above, it is an object of the invention to provide a holographic scanner motor (a motor that utilizes the hologon scanning disc as part of the rotor) having an improved structure that aids in maintaining the temperature stability of the hologon scanner disc to prevent optical distortions due to nonuniform heating.

It is a further object of the invention to provide a holographic scanner motor having an improved structure which aids in the cooling of hologon scanner disc that is compact in design.

SUMMARY OF THE INVENTION

The invention provides a holographic scanner motor of compact design that has a structure which aids in maintaining the temperature stability of the hologon scanner disc. More specifically, the present invention provides a holographic scanning motor that includes a ring shaped rotor, a hologon scanning disc located within the ring shaped rotor, an air bearing assembly on which the rotor rides, and a stator assembly coupled to the air bearing assembly by a sleeve structure.

One or more of three basic structural elements are incorporated in the scanning motor to aid in maintaining the temperature stability of the scanning disc. The first element is the incorporation of at least one vent hole in the motor structure to aid in the flow of cooling air. The second element is the provision of at least one fan blade adjacent one side of the disc to increase the flow of convention cooling air supplied to the surface of the disc. The fan blade also acts as a heat sink to dissipate heat from the rotor. The third element is a mounting pad structure that increases the thermal resistance to heat flow from the rotor to the disc.

The overall size of the scanning motor is reduced by forming the rotor as a Y-shaped ring which permits the rotor magnets to be placed on the "stem" of the Y-shaped motor. Further reductions in size are accomplished by forming the rotor magnet as part of the rotor stem.

Other advantages and objects will become apparent from the detailed description of the preferred embodiments of the invention provided below.

BRIEF DESCRIPTION OF THE DRAWINGS

With the above as background, reference should now be made to the following detailed description of the preferred embodiments with reference to the accompanying drawings in which.

DETAILED DESCRIPTION OF THE PREFERRED EMBODIMENTS

Figure 1:
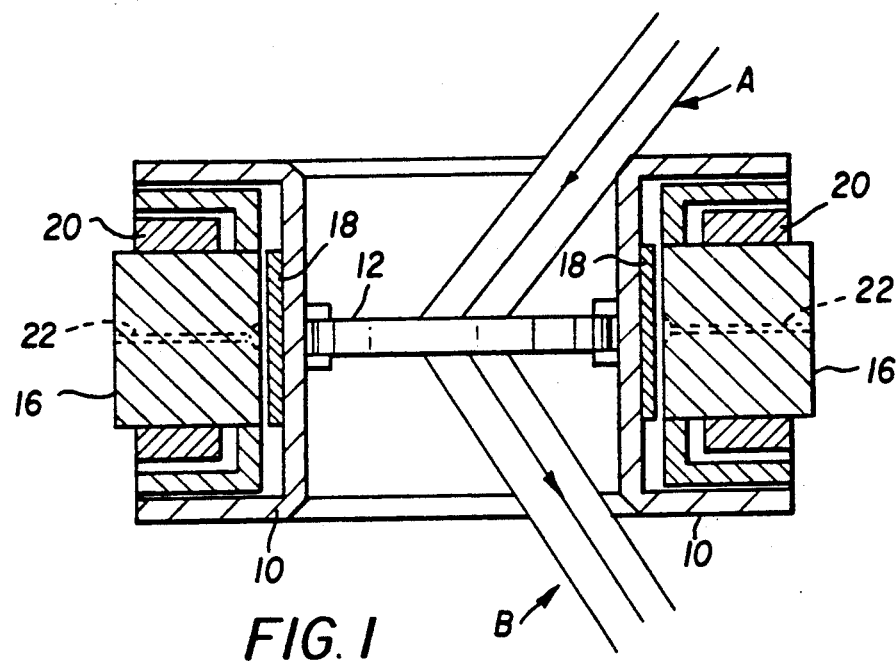
FIG. 1 illustrates a holographic scanner motor that incorporates the use of an air bearing.

FIG. 1 illustrates a cross-sectional view of holographic scanner motor having a rotor 10 on which is mounted a hologon scanning disc 12. The rotor 10 is formed of a U-shaped ring that fits over a stator structure 16. Permanent magnets 18 are provided on the bottom of the "U" opposite the stator structure 16. The application of an electrical signal to motor windings 20 causes the rotor 10 to rotate. The rotor 10 rides on an air bearing, i.e., a cushion of air, provided between the rotor 10 and stator structure 16. Air pressure is maintained through an air inlet 22 provided in the stator structure 16.

A laser beam "A" is focused on the hologon scanning disc 12 as it is rotated. One or more gratings are provided on the hologon scanning disc 12 to deflect the laser beam "A" along path "B". The deflected laser beam is supplied to a lens assembly (not shown) which focuses the deflected laser beam on a printing substrate. The deflected laser beam scans across the printing substrate as the hologon scanning disc 12 rotates.

Heat is generated as the rotor 10 rotates about the stator structure 16, which in turn causes the hologon scanning disc 12 to warm in a nonuniform manner. The warming of the hologon scanning disc 12 causes mechanical strain and/or shifting of the holographic grating located on the scanning disc 12, which results in optical distortions that cause errors in the deflection of the laser beam. The deflection errors result in a degradation in images produced from the deflected laser beam.

Figure 2:
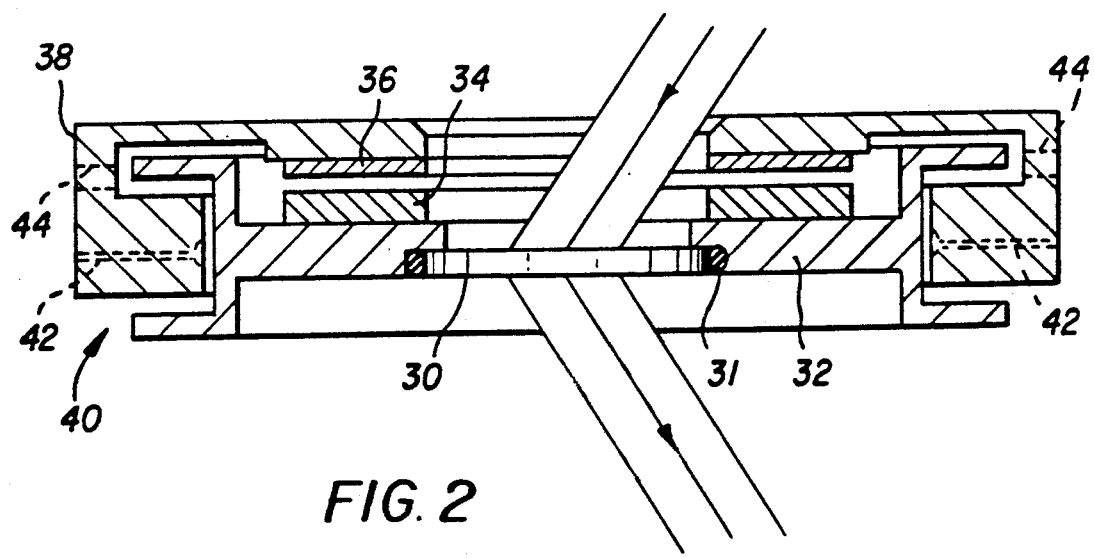
FIG. 2 illustrates a holographic scanner motor in accordance with a first embodiment of the invention.

The invention is directed to providing a holographic scanner motor having an improved structure that aids in the cooling of the hologon scanner disc to prevent optical distortions due to nonuniform heating of the disc. FIG. 2 illustrates a first embodiment of a holographic scanner motor in accordance with the present invention. A hologon scanning disc 30 is press fit with a rubber gasket 31 within a rotor 32. Additional retaining clips (not shown) can also be employed if desired. The rotor 32 is preferably formed as a Y-shaped ring with permanent rotor magnets 34 mounted on the stem or lower portion of the "Y". A stator structure 36 is provided opposite the permanent rotor magnets 34. The stator structure 36 is coupled to a sleeve 38 which includes an air bearing assembly 40 having an air inlet passage 42. The air bearing assembly 40 can either be externally pressurized or of a self actuating type. The application of an electrical signal to the motor windings in the stator structure 36 cause the rotor 32 to rotate. The upper portion of the "Y" shaped rotor 32 rides over the air bearing assembly 40.

The sleeve 38 includes one or more vent slots or holes 44 that permit ventilation of the heated air from between the stator structure 36 and the rotor 32. A supply of ventilation air is provided through the air inlet 42 of the air bearing assembly 40. The vent slots 44 are preferably located parallel to the air inlet when an externally pressurized air bearing is employed and perpendicular to the air inlet when a self activating air bearing is employed. The provision of the vent slots 44 allows the heat from the stator structure 36 and the rotor 32 to be transferred to the cooling air which exits via the vent slots 44, thereby preventing the transfer of heat to the hologon scanning disc 30. Thus, the hologon scanning disc 30 is maintained at a uniform temperature and optical distortions due to overheating are avoided.

Figure 3A:
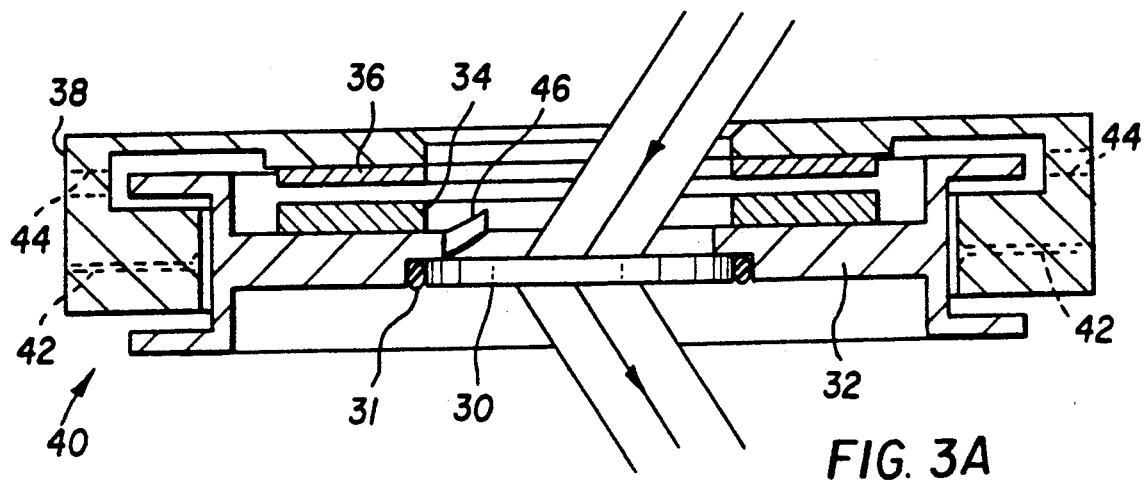
FIG. 3A illustrates a holographic scanner motor of the type illustrated in FIG. 2 with at least one fan blade provided on one side of the rotor.
Figure 3B:
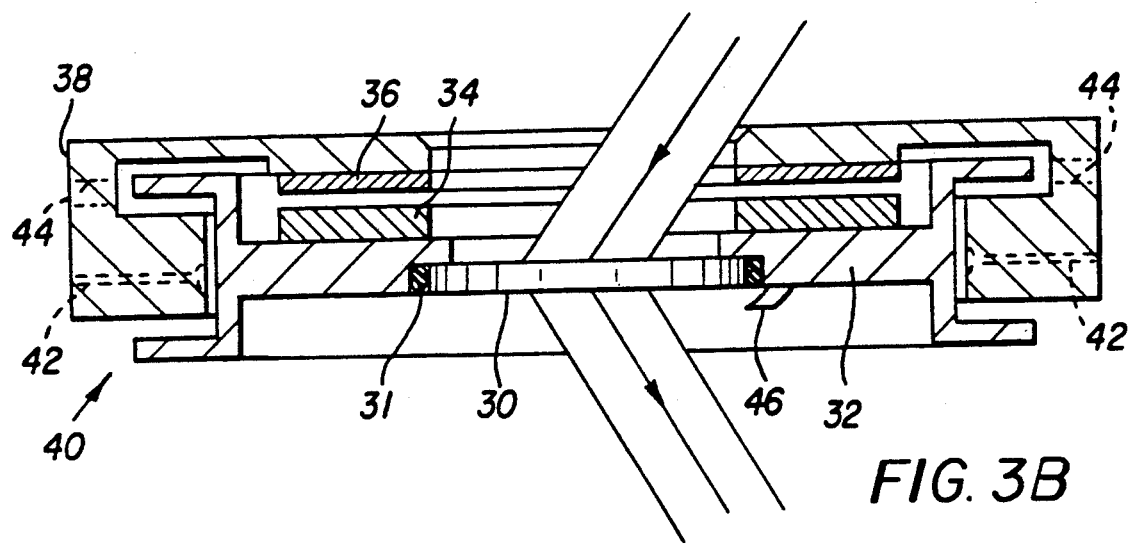
FIG. 3B illustrates a holographic scanner motor of the type illustrated in FIG. 2 with at least one fan blade provided on an opposite side of the rotor than the side illustrated in FIG. 3A.
Figure 3C:
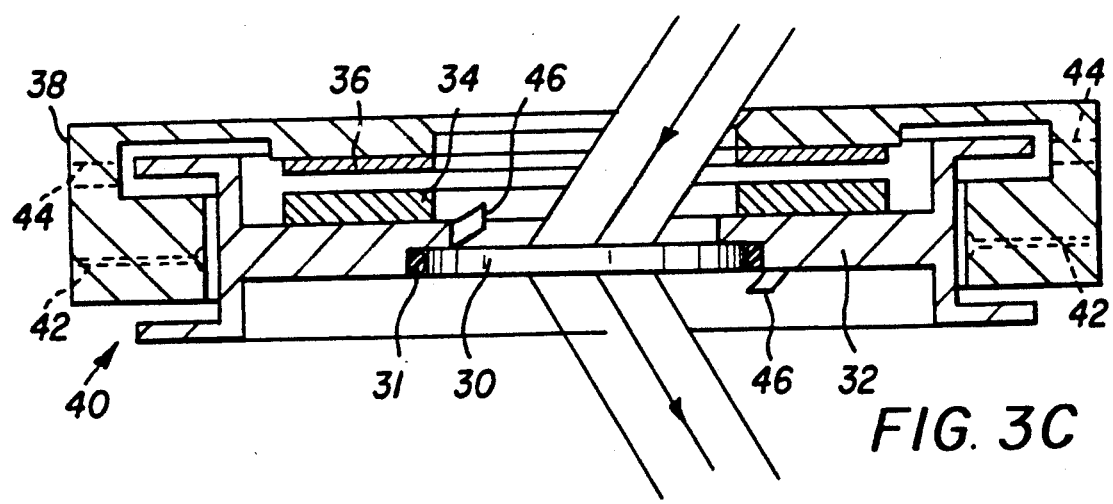
FIG. 3C illustrates a holographic scanner motor of the type illustrated in FIG. 2 with at least one fan blade on each side of the rotor.

Further cooling of the hologon scanning disc 30 is accomplished by the addition of one or more fan blades 46 to the rotor 32 at a location adjacent to the hologon scanning disc 30 as shown in FIGS. 3A-3C. The fan blades 46 are attached to side of the rotor 32 on which the rotor magnet 34 are mounted in the embodiment illustrated in FIG. 3A and have a pitch which forces air to circulate about the top surface (the surface on which the laser beam impinges) of the hologon scanning disc 30. The fan blades 46 are attached to the opposite side of the rotor 32 in the embodiment illustrated in FIG. 3B and have a pitch which forces air to circulate about the bottom surface (the surface from which the deflected laser beam exits) of the hologon scanning disc 30. The fan blades 46 are attached to both sides of the rotor 32 in the embodiment illustrated in FIG. 3C. The air circulated by the fan blades 46 further controls the temperature stability of the hologon scanning disc 30 by providing convection cooling of the top and bottom surfaces of the hologon scanning disc 30.

The fan blades 46 also act as heat sinks to draw heat from the rotor 32. The heat drawn by the fan blades 46 is transferred to the cooling air circulated above the surfaces of the hologon scanning disc 30 by the fan blades 46. Heat generated from the area of the rotor magnets 34 therefore migrates to the heat sinking fan blades 46 instead of to the hologon scanning disc 30.

Figure 4:
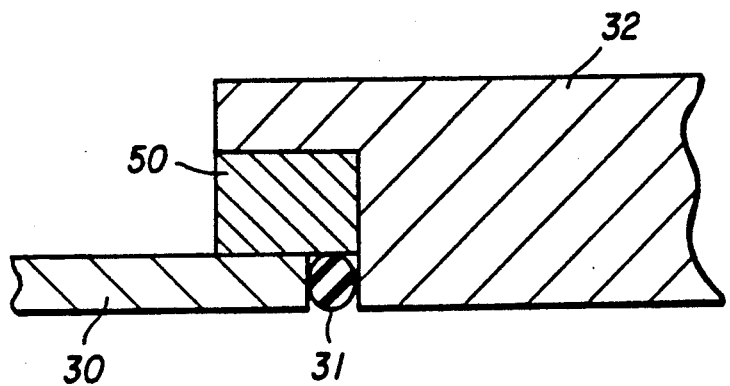
FIG. 4 illustrates a mounting pad formed of an insulating material.
Figure 5:
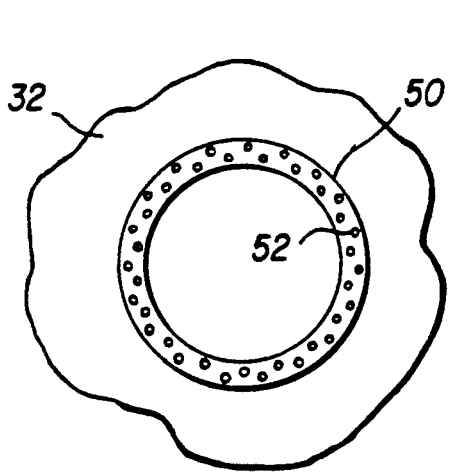
FIG. 5 illustrates a mounting pad having holes formed therein to increase heat resistance.
Figure 6:
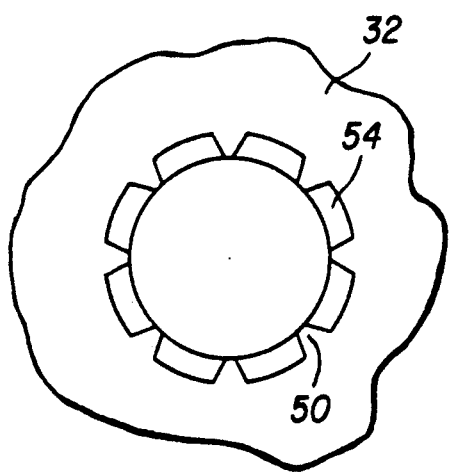
FIG. 6 illustrates a mounting pad incorporating slots to improve heat resistance.

Thermal stability is further enhanced by providing mounting pads 50 which have a higher thermal resistance than the rotor 32 in the areas where the hologon scanning disc 30 contacts the rotor 32 as shown in FIG. 4. The mounting pads 50 can either be formed of a insulating material as shown in FIG. 4 (for example a ceramic insulator) or can be formed to reduce the surface area of the rotor 32 in contact with the scanning disc 30. For example, FIGS. 5 and 6 illustrate mounting pads 50 (viewed in plane of rotor) that include a portion of the rotor 32 respectively having holes 52 and slots 54 formed therein which increase the resistance to heat flow in the mounting pads 50. Thus, heat generated in the rotor magnets 34 is more likely to flow away from the hologon scanning disc 30 and toward the air bearing assembly 40. Alternatively, the insulating mounting pad 50 shown in FIG. 4 is provided with the holes or slots illustrated in FIGS. 5 and 6.

In addition to providing enhanced temperature stability of the hologon scanning disc, the structure of the holographic scanning motor illustrated in FIGS. 2-3C is much more compact that the structure illustrated in FIG. 1. This is due to the provision of the Y-shaped rotor 32 which permits the rotor magnets 34 to be mounted on the stem of the rotor 32 instead of on the outer circumference of the rotor as required in the structure of FIG. 1. Thus, the structure illustrated in FIGS. 2-3C provides a much more compact planar motor design.

Figure 7:
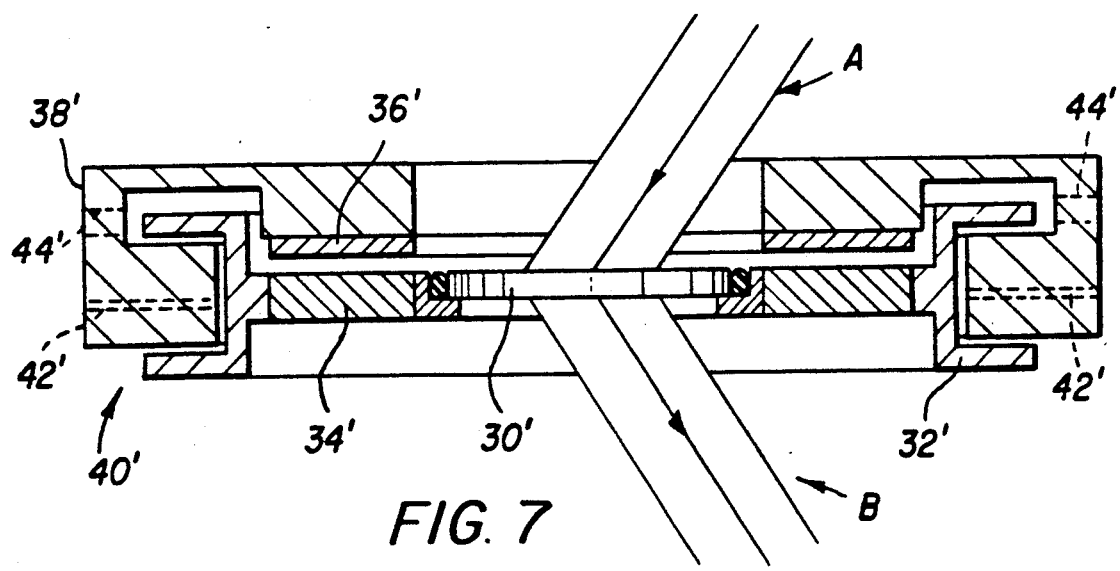
FIG. 7 illustrates a holographic scanner motor in accordance with a second embodiment of the invention wherein the permanent rotor magnets are located within the stem of the rotor.
Figure 8A:
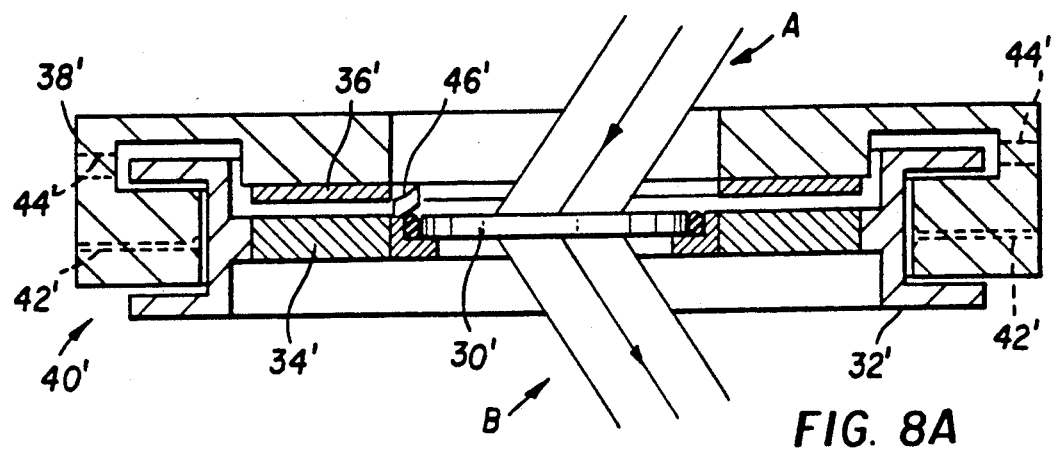
FIGS. 8A-8C illustrate the placement of fan blades on the rotor of the embodiment illustrated in FIG. 7.
Figure 8B:
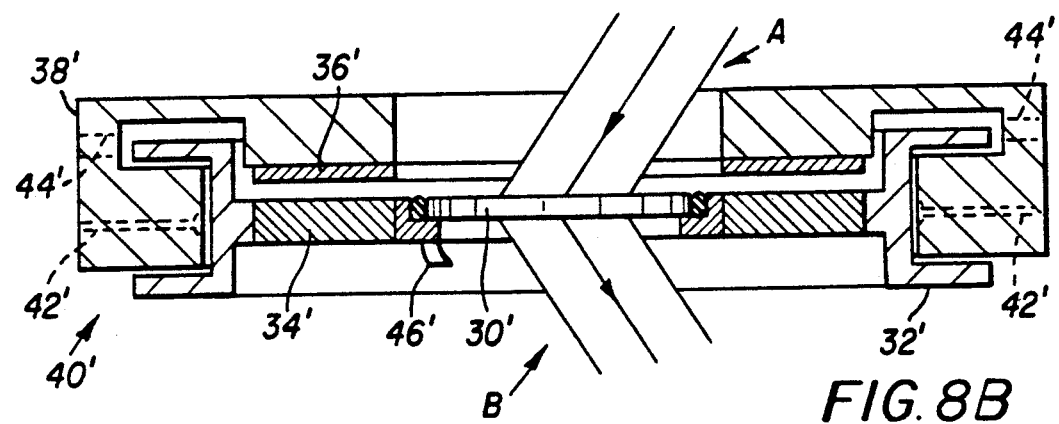
Figure 8C:
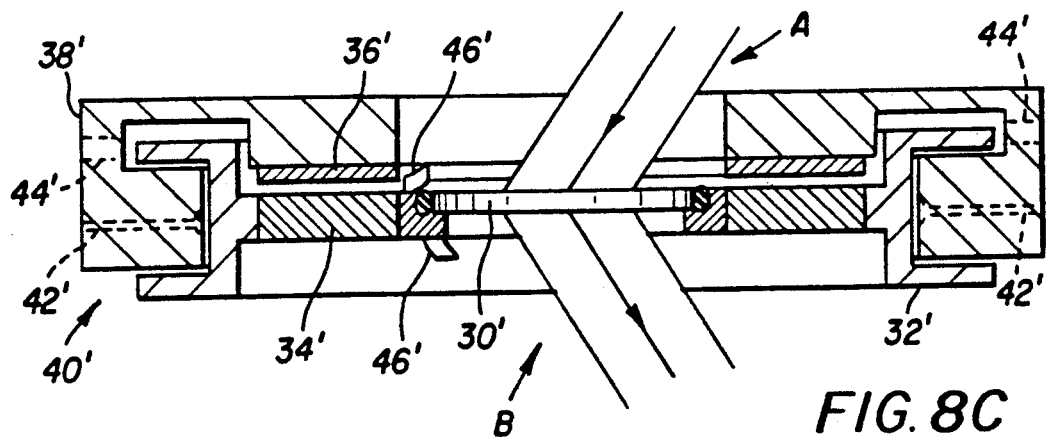

The overall size of the holographic scanning motor is further reduced, however, by incorporating the permanent rotor magnets within the rotor stem. Referring to FIG. 7, a second embodiment of a holographic scanning motor in accordance with the invention is shown with like components indicated with a prime (') notation. The permanent rotor magnets 34' are located with the stem of the Y-shaped rotor 32'. Thus, the width of the motor can be further reduced. Fan blades 46' can also be included on rotor 32, as illustrated in FIGS. 8A-8C.

Figure 9:
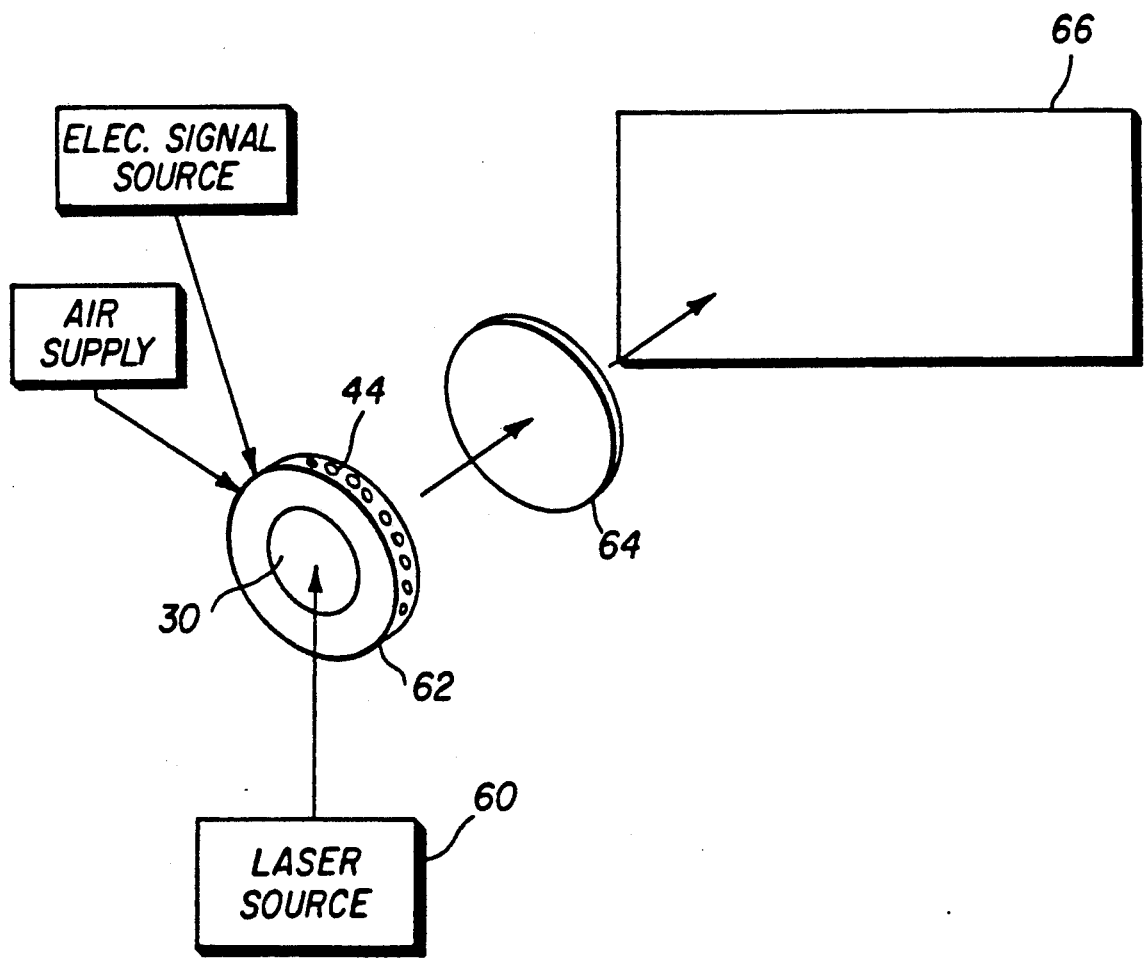
FIG. 9 illustrates a printing device that incorporates a holographic scanner motor of the types illustrated in FIGS. 2-8C.

The invention is applicable to holographic scanning motors used in all types of scanning systems. One particular industrial use, however, is in a printing device as illustrated in FIG. 9. A laser source 60 focuses a laser beam on a hologon scanning disc located within a holographic scanning motor 62 of the types illustrated in FIGS. 2A-8C. The deflected laser beam is focused by a lens assembly 64 onto a printing substrate 66. The printing substrate 66 can be any type of photosensitive material including photographic paper or an electrostatic printing drum.

While the invention has been described with reference to certain preferred embodiments thereof, modifications and variations within the scope of the appended claims are possible. The specific structure of the stator assembly and its connection to the air bearing assembly, as well as the location and shape of the vent slots, can be varied. In addition, the location of the fan blades on either side of the rotor can be varied as long as they provide the required cooling capacity. It will also be understood that various combinations of the structures illustrated in FIGS. 2-8C are possible, although greatest cooling efficiency is accomplished by incorporating the vent slots, mounting pads and fan blades in one motor structure.

What is claimed is:

1. A holographic scanning motor comprising: a ring shaped rotor; a hologon scanning disc located within the ring shaped rotor; an air bearing assembly on which the rotor rides; and a stator assembly coupled to the air bearing assembly by a sleeve structure; wherein the sleeve structure includes at least one vent slot.

2. A holographic scanning motor as claimed in claim 1, wherein the rotor is a Y-shaped rotor.

3. A holographic scanning motor as claimed in claim 2, wherein the rotor includes at least one permanent magnet mounted on the stem of the rotor.

4. A holographic scanning motor as claimed in claim 2, wherein the stem of the rotor includes at least one permanent magnet incorporated therein.

5. A holographic scanning motor as claimed in claim 1, further comprising at least one fan blade located on at least one side of the rotor adjacent the hologon scanning disc.

6. A holographic scanning motor as claimed in claim 1, further comprising at least one fan blade located adjacent the hologon scanning disc on each side of the rotor.

7. A holographic scanning motor as claimed in claim 1, wherein said rotor includes a mounting pad adjacent said hologon scanning disc that has a higher thermal resistance than said rotor.

8. A holographic scanning motor as claimed in claim 7, wherein said mounting pad comprises an insulating material.

9. A holographic scanning motor as claimed in claim 7, wherein said mounting pad includes means for reducing the surface area of the mounting pad in contact with the hologon scanning disc.

10. A holographic scanning motor comprising: a ring shaped rotor; a hologon scanning disc located within the ring shaped rotor; an air bearing assembly on which the rotor rides; a stator assembly coupled to the air bearing assembly by a sleeve structure; and at least one fan blade located on at least one side of the rotor adjacent the hologon scanning disc.

11. A holographic scanning motor as claimed in claim 10, wherein the rotor is a Y-shaped rotor.

12. A holographic scanning motor as claimed in claim 11, wherein the rotor includes at least one permanent magnet mounted on the stem of the rotor.

13. A holographic scanning motor as claimed in claim 11, wherein the stem of the rotor includes at least one permanent magnet incorporated therein.

14. A holographic scanning motor as claimed in claim 10, wherein said rotor includes a mounting pad adjacent said hologon scanning disc that has a higher thermal resistance than said rotor.

15. A holographic scanning motor as claimed in claim 14, wherein said mounting pad comprises an insulating material.

16. A holographic scanning motor as claimed in claim 14, wherein said mounting pad includes means for reducing the surface area of the mounting pad in contact with the hologon scanning disc.

17. A holographic scanning motor comprising: a ring shaped rotor; a hologon scanning disc located within the ring shaped rotor; an air bearing assembly on which the rotor rides; a stator assembly coupled to the air bearing assembly by a sleeve structure; wherein said rotor includes a mounting pad adjacent said hologon scanning disc that has a higher thermal resistance than said rotor.

18. A holographic scanning motor as claimed in claim 17, wherein the rotor is a Y-shaped rotor.

19. A holographic scanning motor as claimed in claim 18, wherein the rotor includes at least one permanent magnet mounted on the stem of the rotor.

20. A holographic scanning motor as claimed in claim 18, wherein the stem of the rotor includes at least one permanent magnet incorporated therein.

21. A holographic scanning motor as claimed in claim 17, wherein said mounting pad comprises an insulating material.

22. A holographic scanning motor as claimed in claim 17, wherein said mounting pad includes means for reducing the surface area of the mounting pad in contact with the hologon scanning disc.

* * * * *